United States Patent
S et al.

(10) Patent No.: US 11,787,557 B2
(45) Date of Patent: Oct. 17, 2023

(54) METHODS AND SYSTEMS FOR REPRESENTING A TIME SCALE ON A COCKPIT DISPLAY

(71) Applicant: HONEYWELL INTERNATIONAL INC., Charlotte, NC (US)

(72) Inventors: Anoop S, Bangalore (IN); Mohammed Ibrahim Mohideen, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 180 days.

(21) Appl. No.: 17/352,526

(22) Filed: Jun. 21, 2021

(65) Prior Publication Data

US 2022/0348350 A1  Nov. 3, 2022

(30) Foreign Application Priority Data

Apr. 30, 2021 (IN) .............................. 202111019884

(51) Int. Cl.
*B64D 43/00* (2006.01)
*G08G 5/04* (2006.01)
*G05D 1/10* (2006.01)
*G08G 5/00* (2006.01)

(52) U.S. Cl.
CPC ............. *B64D 43/00* (2013.01); *G05D 1/104* (2013.01); *G08G 5/0021* (2013.01); *G08G 5/0052* (2013.01); *G08G 5/045* (2013.01)

(58) Field of Classification Search
CPC ...... B64D 43/00; G05D 1/104; G08G 5/0021; G08G 5/0052; G08G 5/045
See application file for complete search history.

(56) References Cited

U.S. PATENT DOCUMENTS

| | | | | |
|---|---|---|---|---|
| 6,271,768 B1 * | 8/2001 | Frazier, Jr. | ........... | G08G 5/0078 340/961 |
| 7,006,032 B2 * | 2/2006 | King | ............... | G01S 3/023 342/29 |
| 7,570,178 B1 * | 8/2009 | Whalen | ............... | G08G 5/0078 340/961 |
| 7,743,337 B1 * | 6/2010 | Maeda | ............... | G01C 21/3682 340/995.27 |
| 7,765,061 B1 * | 7/2010 | Barber | .................. | G01C 23/00 701/465 |

(Continued)

FOREIGN PATENT DOCUMENTS

CN  105303893 A  *  2/2016  .......... G08G 5/0021
EP  0877915 A1  11/1998

(Continued)

*Primary Examiner* — Dale W Hilgendorf
(74) *Attorney, Agent, or Firm* — Lorenz & Kopf LLP

(57) ABSTRACT

Methods and systems are provided for displaying multiple time rings on an avionic display. The method includes displaying at least a first time ring in an avionic display; displaying at least a second time ring in the avionic display wherein the first and second time rings include a pair of visually spaced apart time rings wherein a visual spacing apart between the first and second time rings is indicative of a range and a separation flight time between each of the time rings; and displaying, about at least the first time ring in the avionic display, a distance marker of a value for a range and a time marker of a value for separation flight time about an ownship's position and airspeed, and to at least one time ring.

17 Claims, 4 Drawing Sheets

(56) References Cited

U.S. PATENT DOCUMENTS

| | | | |
|---|---|---|---|
| 8,099,201 B1 | 1/2012 | Barber et al. | |
| 8,830,090 B2 * | 9/2014 | Shafaat | G08G 5/0021 340/979 |
| 9,142,133 B2 | 9/2015 | Palanisamy et al. | |
| 9,176,324 B1 * | 11/2015 | Scherer | G06T 19/006 |
| 9,524,571 B2 | 12/2016 | Coulmeau et al. | |
| 9,721,475 B2 * | 8/2017 | Bazawada | G08G 5/003 |
| 10,597,167 B1 | 3/2020 | Thompson | |
| 10,710,740 B1 | 7/2020 | Tchon et al. | |
| 10,713,960 B1 * | 7/2020 | Ziarnick | G01C 23/005 |
| 10,909,865 B2 * | 2/2021 | Balasubramanian | G08G 5/0013 |
| 11,077,958 B1 * | 8/2021 | Letsu-Dake | G08G 5/0021 |
| 2002/0008640 A1 * | 1/2002 | Horvath | G08G 5/0021 340/815.4 |
| 2008/0186207 A1 * | 8/2008 | Fetzmann | G08G 5/006 340/972 |
| 2010/0070176 A1 * | 3/2010 | Feyereisen | G08G 5/0086 701/448 |
| 2011/0066362 A1 * | 3/2011 | He | G08G 5/0013 701/120 |
| 2012/0078495 A1 * | 3/2012 | Hamblin | G08G 5/0008 701/120 |
| 2013/0009792 A1 * | 1/2013 | Shafaat | G08G 5/0013 340/979 |
| 2013/0060466 A1 * | 3/2013 | Gurusamy | G01C 23/005 701/465 |
| 2013/0144518 A1 * | 6/2013 | Dacre-Wright | G08G 5/0021 701/121 |
| 2013/0204523 A1 * | 8/2013 | He | G08G 5/0021 701/527 |
| 2013/0268878 A1 | 10/2013 | Le Roux et al. | |
| 2015/0120177 A1 * | 4/2015 | Palanisamy | G08G 5/0021 701/120 |
| 2016/0297540 A1 * | 10/2016 | Yochum | B64D 43/00 |
| 2017/0158345 A1 | 6/2017 | Saez et al. | |
| 2017/0315706 A1 * | 11/2017 | Helppi | G08G 5/0021 |
| 2019/0019422 A1 * | 1/2019 | Khatwa | G08G 5/0021 |
| 2019/0043374 A1 * | 2/2019 | Mere | G05D 1/1062 |
| 2019/0371183 A1 * | 12/2019 | Mecklem | G08G 5/0078 |
| 2021/0134164 A1 * | 5/2021 | Bouda | B64D 43/00 |

FOREIGN PATENT DOCUMENTS

| | | | | |
|---|---|---|---|---|
| EP | 3492387 A1 | 6/2019 | | |
| GB | 2579191 A * | 6/2020 | | B64D 43/00 |
| KR | 101007968 B1 * | 1/2011 | | G06F 3/0488 |

* cited by examiner

METHODS AND SYSTEMS FOR REPRESENTING A TIME SCALE ON A COCKPIT DISPLAY

CROSS REFERENCE TO RELATED APPLICATION

The present application claims benefit of prior filed Indian Provisional Patent Application No. 202111019884, filed Apr. 30, 2021, which is hereby incorporated by reference herein in its entirety.

TECHNICAL FIELD

The present disclosure relates generally to the presentation of a timescale on flight display systems on an aircraft. More particularly, embodiments of the present disclosure provide methods and systems for displaying time rings with time and range markers on an avionic display that visually communicate associated real-time time separations between the ownship and at least other traffic for maintenance of a required minimum separation time between aircraft during an approach to a destination.

BACKGROUND

For pilots engaged especially in supersonic flight, as well as in subsonic flights, awareness of a time scale during in-flight operations can be deemed on par with critical information of the aircraft's current distance scale. The need to know is based on the concept that when an aircraft is flying at a high airspeed the change in distance occurs at a high rate allowing, in many instances, little time or insufficient time for decision making in advance by the pilot in-flight for the required route and/or trajectory changes.

It is therefore desirable for the pilot to be able to visually monitor changes to the route and trajectory on an avionic display based on a time change or time frame rather than solely by the distance covered by the aircraft in-flight.

The present disclosure provides a technical solution in the form of a set of time rings displayed on an avionic display that visually communicates a current flight separation time to the pilot of the ownship to a selected point of interest or another aircraft ahead while in-flight.

Other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a method for displaying multiple time rings on an avionic display is provided. The method includes displaying at least a first time ring in an avionic display; displaying at least a second time ring in the avionic display wherein the first and second time rings include a pair of visually spaced apart time rings wherein a visual spacing apart between the first and second time rings is indicative of a range and a separation flight time between each of the time rings; and displaying, about at least the first time ring in the avionic display, a distance marker of a value for a range and a time marker of a value for separation flight time in relation to an ownship's position and airspeed, and to at least one time ring.

In at least one exemplary embodiment, the method includes displaying the distance marker and time marker for the range and the separation flight time of a commencing of a supersonic flight phase in relation to the ownship's position and airspeed, and to at least one time ring.

In at least one exemplary embodiment, the method includes displaying the distance marker and time marker for the range and the separation flight time of a transitioning to a subsonic flight phase about the ownship's position and airspeed, and to at least one time ring.

In at least one exemplary embodiment, the method includes displaying the distance marker and time marker in a visual combination wherein the distance marker is displayed above and the time marker is displayed below at least one time ring or vice versa displayed about at least one time ring.

In at least one exemplary embodiment, the method includes displaying the pair of visually spaced apart time rings, that include the first and second time rings in a flight path of an ownship, to represent visually at least a flight time separation between the ownship and another aircraft located ahead of the ownship in the flight path.

In at least one exemplary embodiment, the method includes displaying the flight time separation between the ownship and another aircraft located ahead of the ownship in the flight path to enable situational time awareness of the pilot by visual viewing of the flight time separation by a spacing of the time rings and by a time marker value on the avionic display thereby enabling enhanced control of an ownship flight operation to maintain a time-based separation.

In at least one exemplary embodiment, the method includes the time-based separation includes a two-minute time separation on an approach flight phase.

In at least one exemplary embodiment, the method includes displaying by the time marker, a calculated time separation based on a range separation of the ownship to a selected point of interest on a terrain map depicted on the avionic display.

In at least one exemplary embodiment, the method includes selecting a set of multiple points of interest on the terrain map to correspond to a set of multiple time rings on the avionic display for depicting visual time based separations on the avionic display.

In another exemplary embodiment, a system for presenting multiple time rings on an avionic display of an aircraft is provided. The system includes a display device configured to render an avionics display showing a current location and trajectory of the aircraft; and a controller circuit in operable communication with the avionic display, the controller circuit configured by programming instructions to: display at least a first time ring in an avionic display; display at least a second time ring in the avionic display wherein the first and second time rings include a pair of visually spaced apart time rings wherein the visual spacing apart between the first and second time rings is indicative of a range and a separation flight time between each of the time rings; and display, about at least the first time ring in the avionic display, a distance marker of a value for a range and a time marker of a value for separation flight time in relation to an ownship's position and airspeed, and to at least one time ring.

In at least one exemplary embodiment, the system includes the controller circuit configured by programming instructions to display the distance marker and time marker for the range and the separation flight time of a commencing of a supersonic flight phase in relation to the ownship's position and airspeed, and to at least one time ring.

In at least one exemplary embodiment, the system includes the controller circuit configured by programming instructions to display the distance marker and time marker for the range and the separation flight time of a transitioning to a subsonic flight phase in relation to the ownship's position and airspeed, and to at least one time ring.

In at least one exemplary embodiment, the system includes the controller circuit configured by programming instructions to display the distance marker and time marker in a visual combination wherein the distance marker is displayed above and the time marker is displayed below at least one time ring or vice versa displayed about at least one time ring.

In at least one exemplary embodiment, the system includes the controller circuit configured by programming instructions to display the pair of visually spaced apart time rings, that include the first and second time rings in a flight path of an ownship, to represent visually at least a flight time separation between an ownship and another aircraft located ahead of the ownship in the flight path.

In at least one exemplary embodiment, the system includes the controller circuit configured by programming instructions to display the flight time separation between the ownship and another aircraft located ahead of the ownship in the flight path to enable situational time awareness of the pilot by visual viewing of the flight time separation by a spacing of the time rings and by a time marker value on the avionic display thereby enabling enhanced control of an ownship flight operation to maintain a time-based separation.

In at least one exemplary embodiment, the system provides the time-based separation that includes a two-minute time separation on an approach flight phase.

In at least one exemplary embodiment, the system provides the controller circuit configured by programming instructions to display by the time marker, a calculated time based on a range separation of the ownship to a selected point of interest on a terrain map.

In at least one exemplary embodiment, the system provides the controller circuit configured by programming instructions to display by the time marker, a calculated time separation based on a range separation of the ownship to a selected point of interest on a terrain map depicted on the avionic display.

In at least one exemplary embodiment, the system provides the controller circuit configured by programming instructions to select a set of multiple points of interest on the terrain map to correspond to a set of multiple time rings on the avionic display for depicting visual time based separations on the avionic display.

In yet another exemplary embodiment, a system for displaying a selected time ring to depict the separation of an ownship from an aircraft is provided. The system includes an avionic display; a navigation system configured to determine the location of the ownship and the aircraft; and a controller coupled to the avionic display and the navigation system and configured to display the desired flight path, display a position of the ownship in relation to the desired flight path, display a position of the aircraft in relation to the desired flight path, and display at least one set of time rings on the avionic display in relation to the desired flight path that indicates a desired separation of the aircraft from the ownship.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and wherein.

DETAILED DESCRIPTION

Figure 1:
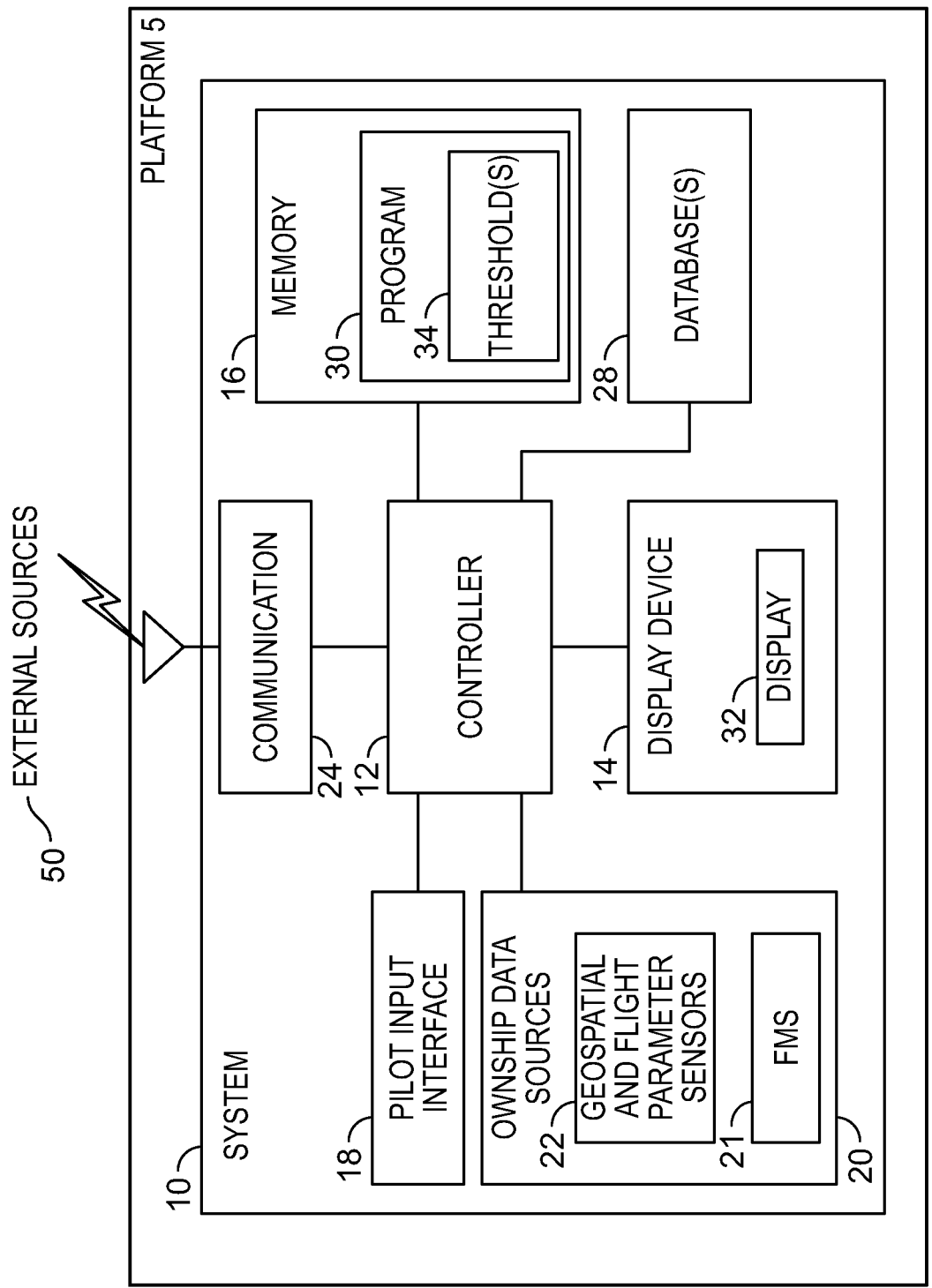
FIG. 1 is a block diagram of a system for presenting multiple time rings with associated separation times on an avionic display, in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set out in the Claims, in any respect. As further appearing herein, the term "pilot" encompasses all users of the below-described aircraft system.

As used herein, the term "present" refers broadly to any means or method for the distribution of information to a flight crew or other aircraft operator, whether visually, aurally, tactilely, or otherwise.

Hence, there exists a need to present a time scale context in primary and navigational display for pilots operating supersonic and subsonic aircraft. The addition of time rings in an avionic display can aid the pilot during the Visual Separation Approach (VSA), CDTI Assisted Visual Approach (CAVS), Flight Interval Management (FIM) operations. Besides spatial separation awareness, the time rings aid the pilot to acquire time separation and maintain separation between the ownship and selected traffic when instructed in traffic operations by the air traffic control.

The minimum time separation for an arriving aircraft with no radar is a time separation of 2 minutes for a medium aircraft behind a heavy aircraft and is 3 minutes for a light aircraft behind a heavy or medium aircraft (for the avoidance of turbulence caused by the heavy or medium aircraft in front). If in an approach phase, and the runway involved has a displaced threshold, the separation minimum time for aircraft on approach for runways with successive arriving departing or departing arriving traffic is 2 minutes.

It is therefore desirable for pilots to be relieved from having to perform the mental calculation to determine and maintain the required 2 or 3-minute time separations by displaying visual time markers with time ring on an avionic display while in-flight thereby decreasing pilot workload (i.e., the pilot not having to perform mental calculations for time separation situation awareness) during a taxing time such as the approach and landing phases.

Air traffic control (ATC) procedures direct individual aircraft to separate from each other to maintain safety. Available flight control methods utilize aircraft current positions for separating aircraft. Using aircraft current positions to achieve required separations can impose a high workload for air traffic controllers in the terminal area. Also, using aircraft current positions to achieve required separations can result in many landing runways not being utilized to their capacity, especially in busiest airports as the separation time needs to be carefully monitored and maintained. Therefore, achieving required aircraft separations while also optimizing runway landing capacities at an airport is a technical problem.

Some solutions to this technical problem include utilizing aircraft trajectories, in addition to the aircraft's current position (spatially). Other solutions to this technical problem utilize aircraft trajectories, the aircraft current position (spatially), and add the aircraft current position (temporally); the solution that adds the temporal, or time, element, transitions the corresponding aircraft control procedures from three dimensions (3D) to four dimensions (4D). Aircraft following 4D trajectories will reduce air traffic controller workload, increase the capacity/throughput of runway surfaces, reduce time and distance flown, reduce fuel burn by increasing predictability of arrival times at 3D waypoints. A typical 4D flight plan clearance from an air traffic controller includes both a position clearance (lat/long/alt) and time clearance. Time clearance is provided as Required Time of Arrival (RTA) to a specified waypoint in the flight plan at a specified time. Therefore, the display of time markers with time rings selected about objects of interest can be beneficial in both 3D and 4D trajectories (especially in the approach trajectory phase) to maintain the required time separations when following an aircraft ahead in an approach.

In an exemplary embodiment, the use of current RTA usage is generally limited to a single RTA constraint in a cruise phase of flight. However, as next-generation procedures evolve, it is anticipated that RTAs will be become more common and proliferate through other phases of flight, including descent and taxi operations (although no altitude constraint, a waypoint with time). Descent profiles typically provide a higher workload to the pilot due to the frequency of both lateral track constraints and vertical constraints, therefore the display of time markers and time rings will decrease the pilot workload, and also enable more usage of RTAs in different phase as time separations can more easily be maintained and coordinated with RTAs.

Further, with RTAs as well as approach separation, the displaying of time rings along with the time markers and ranges between time rings can aid in visual time scale awareness and RTA usage. For example, the visual depiction of pairs or sets of time rings can aid the pilot to determine the amount of available time to act or distance to act when a transition from subsonic to supersonic segments (or vice-versa) begins, the time to reach a specific point of interest, the time to clear in-flight a particular obstacle and to determine a time spacing between a selected aircraft when instructed to follow by VSA/CAVS/FIM operations.

In an exemplary embodiment, the time difference visually depicted between an ownship with respect to the tagged and selected aircraft will assist a pilot in maintaining the time separation for a safe landing. The time rings will aid the pilot to determine the response time available to respond to any severe weather which is along with the flight plan. Similarly, with the use of time rings, the pilot will be able to correlate the sonic boom prediction for the next few minutes with respect to the terrain and map view.

For example, any changes to a supersonic flying corridor instructed by the air traffic controller (ATC) can result in the pilot needing to understand the time frame required to reach the new corridor. The pilot then can plan the required changes to flight parameters (e.g., speed) accordingly. In a current avionic display, almost all information is presented giving spatial and distance context. For example, the range rings in Synthetic Vision Display help pilot understand the radial distance from ownship to terrain or terrain-related information presented ahead. The navigational map, similarly, provide selected map range information for the pilot to acquire distance awareness for plan view terrain and other strategic flight plan information displayed on the navigation display.

Assuring the separation of individual aircraft to maintain safety, as required by regulating authorities and Air traffic control (ATC) procedures, is a technical problem that can even affect taxi operations (although a taxi operation has no altitude constraint, it can be considered a waypoint with time). In exemplary embodiments, the present disclosure describes solutions to this technical problem by utilizing the time rings for enhanced time situation awareness by viewing time separation in 4D aircraft trajectories.

Provided embodiments provide a technical solution in the form of a system that provides an intuitive visualization on an avionic display of the time-based separation distances between an ownship and other aircraft. With these features, the present disclosure provides an objectively improved human-machine interface (HMI) over available flight guidance systems.

FIG. 1 is a block diagram of a system 10 for presenting an RTA waypoint with associated time constraints (shortened herein to "system" 10), as illustrated in accordance with an exemplary and non-limiting embodiment of the present disclosure. System 10 may be utilized onboard a mobile platform 5 to provide visual guidance, as described herein. In various embodiments, the mobile platform is an aircraft 5, which carries or is equipped with the system 10. As schematically depicted in FIG. 1, system 10 includes the following components or subsystems, each of which may assume the form of a single device or multiple interconnected devices: a controller circuit 12 operationally coupled to at least one display device 14; computer-readable storage media or memory 16; an optional input interface 18, and ownship data sources 20 including, for example, a flight management system (FMS) 21 and an array of flight system status and geospatial sensors 22.

In various embodiments, system 10 may be separate from or integrated within: the flight management system (FMS) and/or a flight control system (FCS). Although schematically illustrated in FIG. 1 as a single unit, the individual elements, and components of system 10 can be implemented in a distributed manner utilizing any practical number of physically distinct and operatively interconnected pieces of hardware or equipment. When system 10 is utilized as described herein, the various components of system 10 will typically all be located onboard Aircraft 5.

The term "controller circuit" (and its simplification, "controller"), broadly encompasses those components utilized to carry out or otherwise support the processing functionalities of the system 10. Accordingly, the controller circuit 12 can encompass or may be associated with a programmable logic array, application-specific integrated circuit or other similar firmware, as well as any number of individual processors, flight control computers, navigational equipment pieces, computer-readable memories (including or in addition to memory 16), power supplies, storage devices, interface cards, and other standardized components. In various embodiments, the controller circuit 12 embodies one or more processors operationally coupled to data storage having stored therein at least one firmware or software program (generally, computer-readable instructions that embody an algorithm) for carrying out the various process tasks, calculations, and control/display functions described herein. During operation, the controller circuit 12 may be programmed with and execute at least one firmware or software program, for example, program 30, that embodies an algorithm described herein for receiving and processing RTA waypoint information to thereby present a visualization of an RTA waypoint with associated time constraints on an avionic display for an aircraft 5, and to accordingly perform the various process steps, tasks, calculations, and control/display functions described herein.

Controller circuit 12 may exchange data, including real-time wireless data, with one or more external sources 50 (for example, Air Traffic Control) to support the operation of system 10 in embodiments. In various embodiments, controller 12 may receive and process the required time of arrival (RTA) waypoint information for the aircraft 5. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 is a data storage that can encompass any number and type of storage media suitable for storing computer-readable code or instructions, such as the aforementioned software program 30, as well as other data generally supporting the operation of the system 10. Memory 16 may also store one or more threshold 34 values, for use by an algorithm embodied in software program 30. Examples of threshold 34 values include margins of error for altitude deviations, airspeed deviations, and lateral deviations. One or more database(s) 28 are another form of storage media; they may be integrated with memory 16 or separate from it.

In various embodiments, aircraft-specific parameters and information for aircraft 5 may be stored in memory 16 or a database 28 and referenced by program 30. Non-limiting examples of aircraft-specific information include an aircraft's weight and dimensions, performance capabilities, configuration options, and the like.

In various embodiments, two or three-dimensional map data may be stored in a database 28, including airport features data, geographical (terrain), buildings, bridges, and other structures, street maps, and navigational databases including but not limited to waypoints and airways, which may be updated on a periodic or iterative basis to ensure data timeliness. This map data may be uploaded into the database 28 at an initialization step and then periodically updated, as directed by either a program 30 update or by an externally triggered update.

Flight parameter sensors and geospatial sensors 22 supply various types of data or measurements to controller circuit 12 during Aircraft flight. In various embodiments, the geospatial sensors 22 supply, without limitation, one or more: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, display device 14 can include any number and type of image generating devices on which one or more avionic displays 32 may be produced. When system 10 is utilized for a manned Aircraft, display device 14 may be affixed to the static structure of the Aircraft cockpit as, for example, a Head Down Display (HDD) or Head-Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the Aircraft cockpit by a pilot.

At least one avionic display 32 is generated on display device 14 during operation of the system 10; the term "avionic display" is synonymous with the term "aircraft-related display" and "cockpit display" and encompasses displays generated in textual, graphical, cartographical and other formats. System 10 can simultaneously generate various types of lateral and vertical avionic displays 32 on which map views and symbology, text annunciations, and other graphics about flight planning are presented for a pilot to view. The display device 14 is configured to continuously render at least a lateral display showing the aircraft 5 at its current location and trajectory within the map data. The avionic display 32 generated and controlled by the system 10 can include graphical user interface (GUI) objects and alphanumerical input displays of the type commonly presented on the screens of MCDUs, as well as Control Display Units (CDUs) generally. Specifically, embodiments of avionic displays 32 include one or more two dimensional (2D) avionic displays, such as a horizontal (i.e., lateral) navigation display or vertical navigation display (i.e., vertical situation display VSD); and/or, one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the human-machine interface is embodied as a touch screen display device 14. In various embodiments, the human-machine interface includes a touch screen display device 14 and at least one additional pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective system functions and provide user feedback, responsive to received user input at the GUI element.

In various embodiments, system 10 may also include a dedicated communications circuit 24 configured to provide a real-time bidirectional wired and/or wireless data exchange for the controller 12 to communicate with the external sources 50 (including, each of traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic," the communications circuit 24 may incorporate software and/or hardware for communication protocols as needed for traffic collision avoidance (TCAS), automatic dependent surveillance-broadcast (AD SB), and enhanced vision systems (EVS).

In certain embodiments of system 10, the controller circuit 12 and the other components of system 10 may be integrated within or cooperate with any number and type of systems commonly deployed onboard an aircraft including, for example, the FMS 21. System 10 includes a source of an assigned flight plan includes a plurality of waypoints. In various embodiments, the FMS 21 is the source of the assigned flight plan and waypoints.

The disclosed algorithm is embodied in a hardware program or software program (e.g. program 30 in controller circuit 12) and configured to operate when aircraft 5 is in any phase of flight. The algorithm presents RTA waypoint time constraint information to the pilot and crew via at least the avionic display 32.

In various embodiments, the provided controller circuit 12, and therefore its program 30 may incorporate the programming instructions necessary for: (a) receiving and processing aircraft status data and RTA waypoint information, determining a time constraint for an RTA waypoint, commanding the display device 14 to render the navigation display and the VSD on the avionic display 32, and rendering the RTA waypoint using a visual encoding scheme; and (b) maintaining the human-machine interface (HMI), including any associated graphical user interface (GUI) presented on the display device 14.

In operation, the display device 14 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc.

Figure 2:
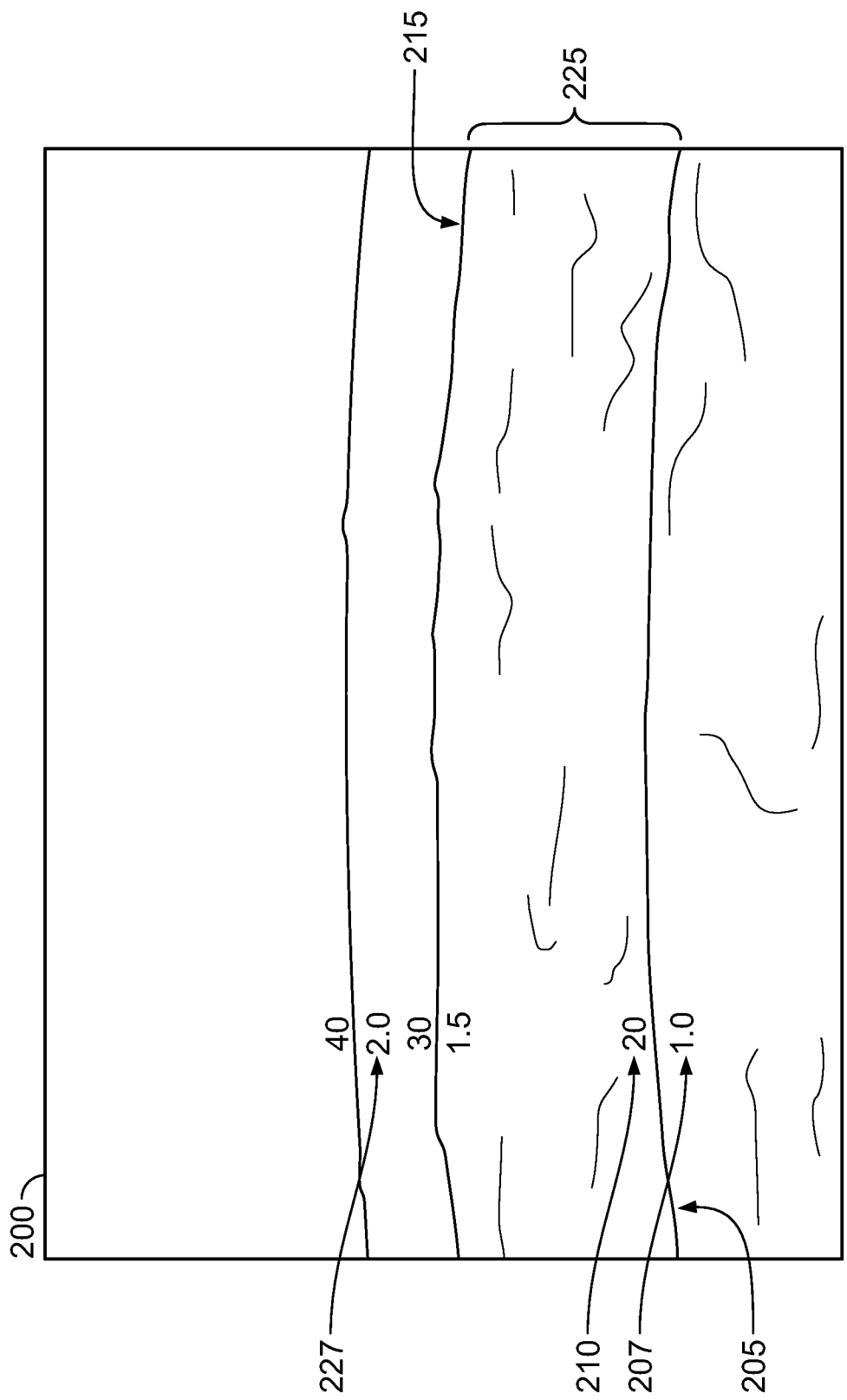
FIGS. 2-3 are simplified illustrations introducing features of an avionic display generated for presenting selected time rings with time and distance markers, in accordance with an exemplary embodiment of the present disclosure.

Turning now to FIG. 2, the operation of various embodiments is described. FIG. 2 provides simplified illustrations to introduce features of a presentation of multiple time rings in a cockpit display 200 associated time markers, and distance.

During operation, the controller circuit 12, which is programmed by programming instructions to receive and process aircraft status data including location and airspeed, commands the display device 14 to render a time ring 205 for the aircraft 5 at its current location and current trajectory in a lateral display and a vertical display and another time ring or multiple time rings ahead in the avionic display 200. The avionic display 200 includes a horizontal or navigation display (INAV) with depictions of multiple time rings, time markers, and distance markers in a flight path.

The avionic display 200 displays a time ring 205 with a distance marker 210, and a time marker 207. The distance marker 210 displays the numerical value "20" which is the distance in nautical miles to the next (or above) time ring 215. The time marker 207 displays the numerical value "1.0" which is the time at the current airspeed of the aircraft 5 to traverse the distance or separation 225 to the next time ring 215 (i.e., the separation time between a set of time rings). In an exemplary embodiment, the time marker 207 displays a numerical value of the separation time between each of the time rings in a pair of time rings.

In an exemplary embodiment, the pilot may select a first and second-time ring. For example, the pilot may select the first time ring (i.e., the time ring 205) and then select the second time ring 215 at a location ahead of an aircraft's current position ahead in the flight path. In this way, the time marker 207 would serve as a visual indicator and value of the separation time between another aircraft or obstacle located at or near the second time ring 215. Further, the separation time value displayed by the time marker 207 would aid pilot in maintaining a required separation time and distance between the aircraft or obstacle ahead.

In another exemplary embodiment, the time scale of the time ring represents a numerical value of "2.0" 227 in FIG. 2. The "2.0 minute" time period can represent a beginning or start of a supersonic segment or can represent the transition from a supersonic inflight segment of aircraft 5 to a subsonic in-flight segment based on a flight plan. In this instance, the time marker 227 and the numerical value of "2.0" (i.e, 2 minutes) can also be used by pilot as an indicator when the aircraft can cruise to a supersonic airspeed (i.e., reach an airspeed of about or greater than Mach I) and can cause the pilot to consider or make a situation-aware conjecture about the time of a sonic boom effect on the ground occurring that is caused by the transition to the supersonic airspeed.

In another exemplary embodiment, the time rings (i.e., 205, 215) can also assist the pilot during Visual Separation Approach (VSA), CDTI Assisted Visual Approach (CAVS), Flight Interval Management (FIM) operations. Besides spatial separation awareness, the time rings help the pilot to acquire time separation between an ownship and selected traffic ahead in a flight path or an approach. This can allow the pilot to maintain the minimum time separation for arriving aircraft with no radar which is required generally to be separated 2 minutes for a medium aircraft behind a heavy aircraft and 3 minutes for a light aircraft behind a heavy or medium aircraft. If the runway involved has a displaced threshold, the separation minimum for runways with successive arriving departing or departing arriving traffic is required to be about 2 minutes. The time markers and distance markers displayed with the time rings provided added visual awareness for the pilot to maintain these 2 and 3-minute time separations.

In another exemplary embodiment, time rings (205, 215) can aid for enhanced time situation awareness of the pilot by enabling viewing of time separation in 4D aircraft trajectories. In this case, with the 4D aircraft trajectories which are defined as the aircraft current position (spatially), and the aircraft current position (temporally) and used in the context of ATC clearance communications provided to the pilot wherein a typical 4D flight plan clearance includes both a position clearance (lat/long/alt) and the added time clearance. The time clearance may be provided or communicated to the pilot as Required Time of Arrival (RTA) to a specified waypoint in the flight plan at a specified time. Therefore visual representation of the time separation to specific RTA to the specified RTA waypoint can be displayed by the pilot selection of one or more time rings positioned on an avionic display that correlates to the specified RTA waypoint. The time marker about the time ring would visually indicate to the pilot the time separation in real-time to the specified RTA waypoint and enhance the pilot time situation awareness and overall situation awareness with both the time marker and distance marker displaying current time and distance information to the specified RTA waypoint during the ownship flight phase.

Figure 3:
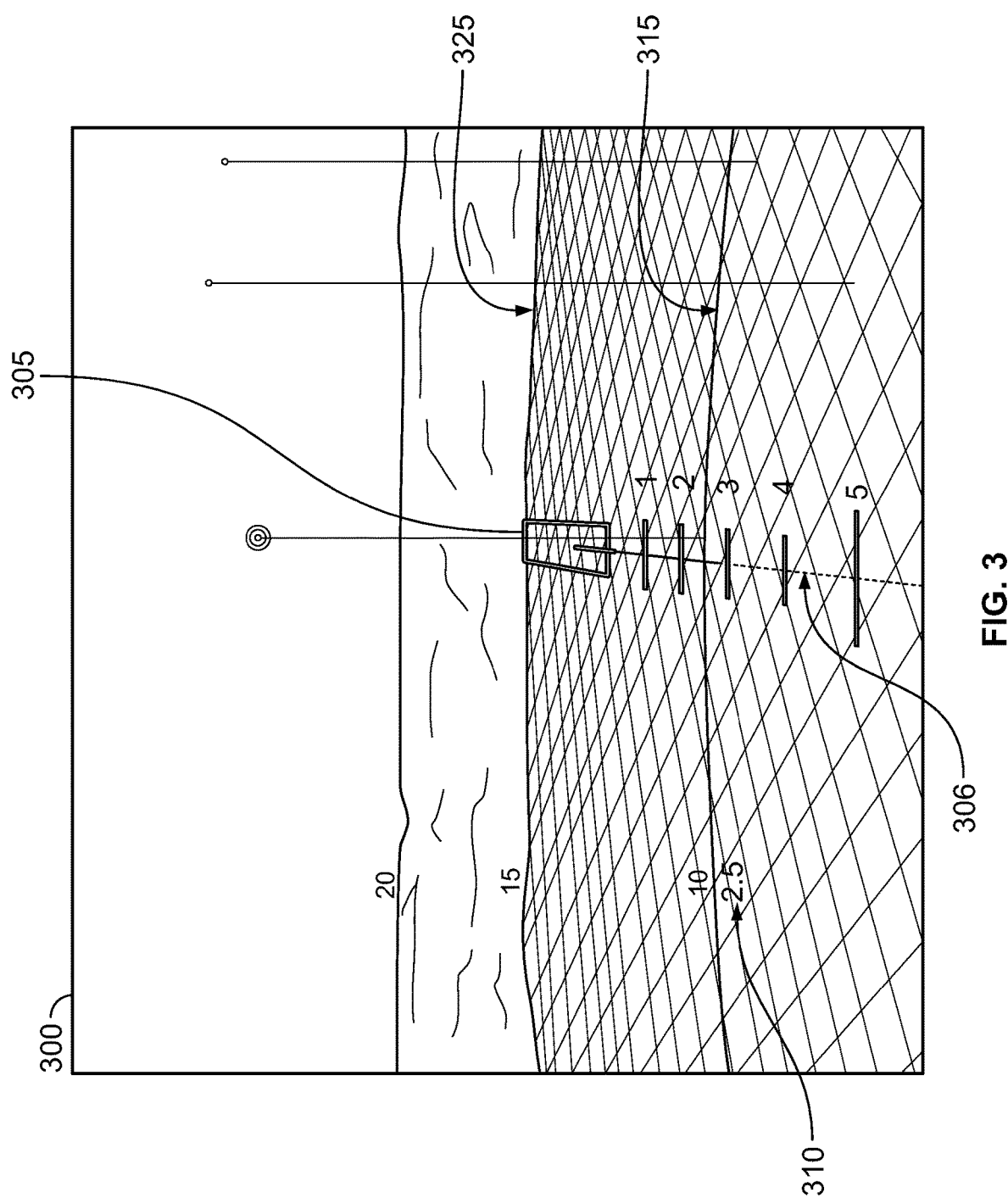

FIG. 3 illustrates an avionic display with the time rings to aid the pilot in reaching a point of interest by selecting a point of interest in a flight path and configuring multiple time rings to the point of interest in accordance with an exemplary embodiment.

In FIG. 3, an avionic display 300 includes a horizontal or navigation display (INAV). Aircraft 5 is shown on a trajectory (or flight path 306) on the navigation display. In case of VSA approaches, a pilot will be asked to follow a leading aircraft and the proposal is to represent the time difference of the ownship with respect to the leading aircraft on a display. The displayed time marker 310 with the time ring 315 and time ring 325 can aid the pilot to maintain a separation of 2.5 mins (at time marker 310) with respect to the leading aircraft (i.e., at time rings 1 to 5). In the scenario depicted in FIG. 3, multiple time rings 1 to 5 can be selected and configured to be displayed at a specific time, e.g. 2.5 mins from the ownship.

In an exemplary embodiment depicted in FIG. 3, the pilot can locate a point of interest 305 that is ahead of the aircraft 5 on its current trajectory or flight path 306 and selects a set of multiple range rings 1 to 5 to that point of interest 305. The pilot by a calculation performed by a controller and displaying of the time marker 310 with the numerical value of "2.5" minutes can determine the time to reach the point of interest 305.

In another exemplary embodiment, for VSA approaches, the pilot may be requested by ATC to follow a leading aircraft and the multiple time rings can aid the pilot visually in this instructed task by providing visual representations of multiple time differences of the ownship to the aircraft ahead on an avionic display. This will increase the pilot situation time awareness as well as spatial awareness and increase the ability of the pilot to control the airship to maintain the separation time of 2.5 mins to aircraft ahead in the flight path. For this scenario, because of the 2.5 minutes instructed separation time, a set of multiple time rings can be selected and configured on the avionic display at specified 2.5 minute time periods (e.g. commencing with a 2.5 from the ownship).

In an exemplary embodiment, the depiction of the time ring with a time marker and distance marker on an avionic display will aid the pilot in 4$^{th}$ dimension information and time situational awareness with RTA by time separations as well as other distance cues during in-flight phases of the ownship.

In an exemplary embodiment, in conjunction with the depictions of the time rings and time/distance marker in FIGS. 2-3, the (i.e., the visualization) of the time-based separations using a selection of time rings provides an objective improvement in the HMI, enabling the pilot to visually assess the ownship position with respect to assumed spatial and temporal points of interest targets.

Figure 4:
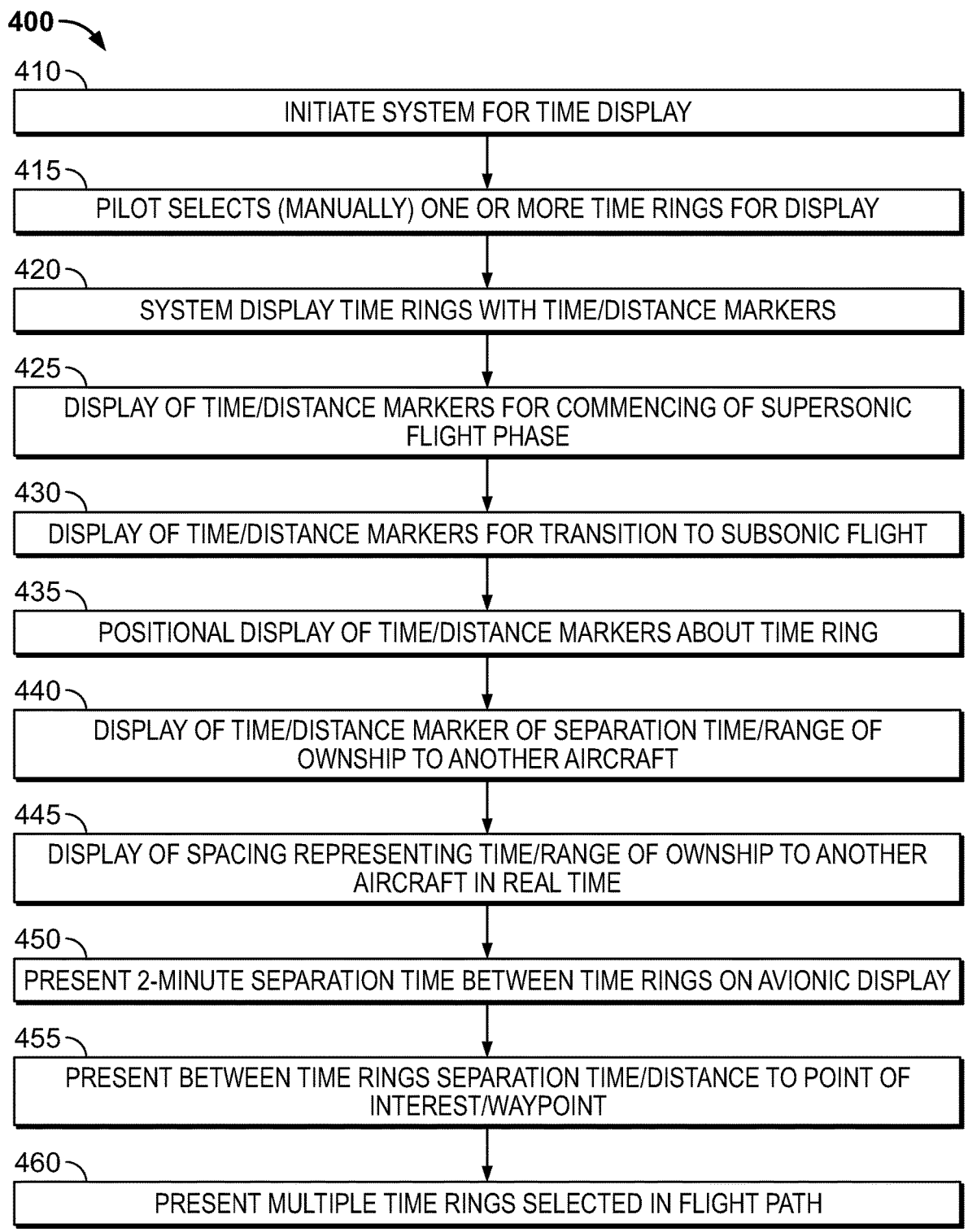
FIG. 4 is an exemplary flow diagram illustrating a method for presenting selected time rings on an avionic display, in accordance with the present disclosure.

In FIG. 4, a flow diagram is provided illustrating a method 400 for displaying a time ring with time and distance markers, in accordance with the present disclosure.

At 410, system 10 is determined to have been programmed with the algorithm and programmed to respond to the selection of time rings by the pilot in an avionic display, and the method determines and renders a current location and trajectory of the aircraft 5 in a navigation display with respect to multiple time rings display where each of the time rings contains numerical values for time and distance markers integrated in pair combinations of corresponding time and distance separations of pairs of time rings. At 415, the pilot can select one or more time rings and position each ring using a touch screen display device 14 and/or at least one additional pilot input interface 18 touch screen or other selection tools connected with the avionic display. In an exemplary embodiment, the pilot can select and first time ring for display and select a second time ring for display.

At 420, the system 10 displays a time ring and the time marker and the distance marker about the time ring. The time marker and distance marker are displayed as a pair about a time ring and indicate visually the time separation and distance between each time ring of a pair displayed. The numerical values for the distance and time of each marker are dynamic and change (by system 10) in relation to the ownship's position and airspeed. At 425, the distance marker and time marker for the distance (range) and the separation flight time of a commencing of a supersonic flight phase in relation to the ownship's current position and airspeed, and the time rings. At 430, the distance marker and time marker are displayed for the distance and the separation flight time of a transition from a subsonic flight phase or airspeed to supersonic airspeed about the ownship's position and airspeed, and the time rings. At 435, the distance and time marker displayed in a visual combination with the distance marker positioned above and the time marker positioned below the time ring or vice versa. At 440, the pair of time rings based on the pilot's selection and positioning of the time rings on the avionic display can represent visually at least the flight time separation between an ownship and another aircraft located ahead of the ownship in the flight path. At 445, the flight time separation between the ownship and another aircraft located ahead of the ownship in the flight path enhances situational time awareness of the pilot by visual viewing of the time separation shown by a current real-time spacing of the time rings and by a time marker value on the avionic display. At 450, the time rings a position and is selected to present a 2-minute time separation (or 3-minute separations or other separations times required) between objects or aircraft and the ownship to aid the pilot in a required 2-minute time separation on the approach phase. At 455, the separation time of a pair of time rings is displayed for a pilot selection of a range separation of the ownship to a selected point of interest on a terrain map depicted on the avionic display or waypoint with time constraints. At 460, multiple points of interest are selected by the pilot on the terrain map to correspond to a set of multiple time rings on the avionic display for depicting visual time-based separations on the avionic display in a flight path or trajectory.

As such, disclosed herein is a flight display system with time rings that presents time separations of the ownship to an aircraft ahead or RTA waypoints with time constraint information, using the visual encoding scheme, on an avionic display 32. System 10 improves upon available algorithms and display techniques by presenting time separation by the spacing between time rings that can be visually viewed on an avionic display by the pilot combined with both time and distance markers of values of separation times and ranges between time rings that correspond to points selected on the avionic display. Additionally, system 10 can improve the safety of taxi operations (as mentioned, although a taxi operation has no altitude constraint, it can be considered a waypoint with time). Thus, system 10 provides an objectively improved human-machine interface (HMI).

While the present disclosure has provided exemplary embodiments directed to a flight display system, it will be appreciated that the embodiments presented herein can be extended to other applications where approach assistance may be desirable, and where approaches may be improved through the use of a display. For example, other suitable applications may include maritime applications, railroad applications, industrial/manufacturing plant applications, space travel applications, simulator applications, and others as will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is being understood that various changes may be made in the function and arrangement of elements described in an exemplary embodiment without departing from the scope of the invention as set forth in the appended claims.

What is claimed is:

1. A method for displaying multiple time rings on an avionic display, the method comprising:
   displaying first and second time rings in relation to a flight path of an ownship on the avionic display to represent a desired separation between the ownship and another aircraft; and
   displaying a first numerical value for a first time marker corresponding to a first value for a first separation flight time associated with the desired separation of the another aircraft from the ownship as represented by the first and the second time rings.

2. The method of claim 1, further comprising:
   displaying a third time ring in relation to the flight path, a distance marker associated with a desired range as represented by the first and third time rings, a second numerical value for a second time marker corresponding to a second value for a second separation flight time associated with the desired range, the desired range and the second separation flight time corresponding to commencing of a supersonic flight phase in relation to the ownship's position and airspeed.

3. The method of claim 1, further comprising:
   displaying a third time ring in relation to the flight path, a distance marker associated with a desired range as represented by the first and third time rings, a second numerical value for a second time marker corresponding to a second value for a second separation flight time associated with the desired range, the desired range and the second separation flight time corresponding to transitioning to a subsonic flight phase in relation to the ownship's position and airspeed.

4. The method of claim 1, further comprising:
   displaying a distance marker having a second numerical value associated with the desired separation and the first numerical value associated with the first time marker, wherein the distance marker is displayed at one of above and below the first time ring and the first time marker is displayed at the other one of the above and the below the first time ring.

5. The method of claim 1, further comprising:
   displaying the first numerical value for the first time marker to enable situational time awareness of a pilot by visual viewing of the first separation flight time by a visual spacing apart between the first and second time rings and by the first numerical value of the first time marker on the avionic display thereby enabling enhanced control of an ownship flight operation to maintain a time-based separation with respect to the another aircraft.

6. The method of claim 5, wherein the time-based separation comprises a two-minute time separation on an approach flight phase.

7. The method of claim 1, further comprising:
   displaying a third time ring in relation to the flight path and a second numerical value for a second time marker, the second numerical value for the second time marker being a calculated second separation flight time based on a desired range separation of the ownship to a selected point of interest on a terrain map depicted on the avionic display as represented by the first and third time rings.

8. The method of claim 7, further comprising:
   selecting a set of multiple points of interest on the terrain map to correspond to a set of multiple time rings on the avionic display for depicting visual time-based separations on the avionic display.

9. A system for presenting multiple time rings on an avionic display of an aircraft, the system comprising:
   a display device configured to render the avionics display showing a current location and trajectory of the aircraft; and
   a controller circuit in operable communication with the avionic display, the controller circuit configured by programming instructions to:
   display first and second time rings in relation to a flight path of an ownship on the avionic display to represent a desired separation between the ownship and another aircraft; and
   display, a first numerical value for a first time marker corresponding to a first value for a first separation flight time associated with the desired separation of the another aircraft from the ownship as represented by the first and second time rings.

10. The system of claim 9, further comprising:
    the controller circuit configured by programming instructions to:
    display a third time ring in relation to the flight path, a distance marker associated with a desired range as represented by the first and third time rings, a second numerical value for a second time marker corresponding to a second value for a second separation flight time associated with the desired range, the desired range and the second separation flight time corresponding to commencing of a supersonic flight phase in relation to the ownship's position and airspeed.

11. The system of claim 9, further comprising:
the controller circuit configured by programming instructions to:
  display a third time ring in relation to the flight path, a distance marker associated with a desired range as represented by the first and third time rings, a second numerical value for a second time marker corresponding to a second value for a second separation flight time associated with the desired range, the desired range and the second separation flight time corresponding to transitioning to a subsonic flight phase in relation to the ownship's position and airspeed.

12. The system of claim 9, further comprising:
the controller circuit configured by programming instructions to:
  display a distance marker having a second numerical value associated with the desired separation and the first numerical value associated with the first time marker, wherein the distance marker is displayed at one of above and below the first time ring and the time marker is displayed at the other one of the above and below the first time ring.

13. The system of claim 9, further comprising:
the controller circuit configured by programming instructions to:
  display the first numerical value for the first time marker to enable situational time awareness of a pilot by visual viewing of the first separation flight time by a spacing between the first and second time rings and by the first numerical value of the first time marker on the avionic display thereby enabling enhanced control of an ownship flight operation to maintain a time-based separation with respect to the another aircraft.

14. The system of claim 13, wherein the time-based separation comprises a two-minute time separation on an approach flight phase.

15. The system of claim 9, further comprising:
the controller circuit configured by programming instructions to:
  display a third time ring in relation to the flight path and a second numerical value for a second time marker, the second numerical value for the second time marker being a calculated second separation flight time based on a desired range separation of the ownship to a selected point of interest on a terrain map as represented by the first and third time rings.

16. The system of claim 15, further comprising:
the controller circuit configured by programming instructions to:
  select a set of multiple points of interest on the terrain map to correspond to a set of multiple time rings on the avionic display for depicting visual time-based separations on the avionic display.

17. A system for displaying a selected time ring to depict separation of an ownship from an aircraft, the system comprising:
  an avionic display;
  a navigation system configured to determine a location of the ownship and the aircraft; and
  a controller coupled to the avionic display and the navigation system and configured to:
  display a desired flight path,
  display a position of the ownship in relation to the desired flight path,
  display a position of the aircraft in relation to the desired flight path,
  display at least one set of time rings on the avionic display in relation to the desired flight path that indicates a desired separation of the aircraft from the ownship, and
  display a numerical value for a time marker corresponding to a value for a separation flight time associated with the desired separation of the aircraft from the ownship as represented by first and second time rings of the at least one set of time rings.

\* \* \* \* \*